Dec. 15, 1953   J. H. CHESTERS   2,662,761
OPEN HEARTH FURNACE

Filed Nov. 30, 1950   2 Sheets-Sheet 1

Inventor
John H. Chesters
By
H. C. ......
Attorney

Dec. 15, 1953     J. H. CHESTERS     2,662,761
OPEN HEARTH FURNACE
Filed Nov. 30, 1950     2 Sheets-Sheet 2
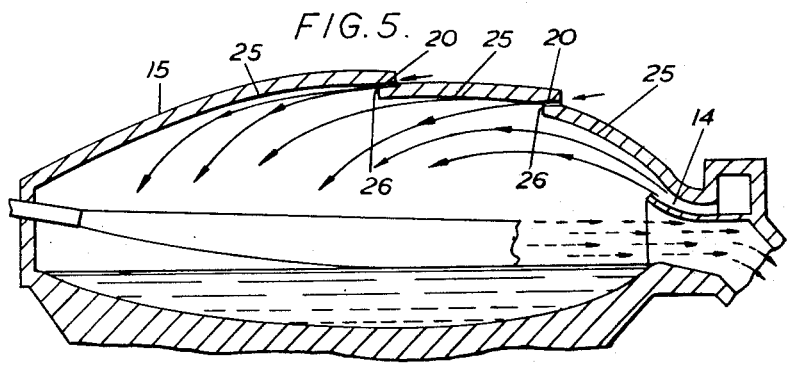
Inventor
John H. Chesters
By
Attorney Patented Dec. 15, 1953

2,662,761

UNITED STATES PATENT OFFICE 2,662,761

OPEN HEARTH FURNACE

John Hugh Chesters, Sheffield, England, assignor to The United Steel Companies Limited, Sheffield, England Application November 30, 1950, Serial No. 198,287

Claims priority, application Great Britain December 5, 1949

7 Claims. (Cl. 263—15)

This invention relates to open-hearth furnaces of the kind used for melting and refining glass, steel or copper.

In an open-hearth furnace, failure of the roof frequently interrupts production. In a typical furnace the average life of a roof 12 inches thick and made of silica bricks is only about ten weeks. The roof does not as a rule wear away uniformly but rather becomes severely damaged in certain areas which are normally in the central part rather than at the ends and are usually adjacent to the back and front walls. The area close to the taphole, which is at the centre of the back wall, is usually most severely attacked.

I have found that it is the impact of flame and waste gases on the roof which is the principal cause of localised wear, the rate of wear being increased by iron oxide, lime and other corrosive materials transported by these gases from the surface of the charge in the furnace. The tendency of the gases to rise upwards and strike the roof is accentuated during the charging and melting periods by the presence of a scrap pile. Moreover, there is a tendency for the entrainment of gases by the fuel jet to produce a return flow of waste gases laden with corrosive material, which are thereby brought into contact with the roof.

Numerous attempts have been made to overcome this localised wear, e. g. by the use of silica bricks of unusually low flux content, or basic bricks, e. g. chrome-magnesite, in the critical areas. Air jets are sometimes turned on to the outer surface of the roof, while the use of cooling pipes passing through the roof blocks has been suggested.

It is an object of this invention to provide a method of and means for prolonging the life of the roof of an open-hearth furnace.

Another object is to introduce air or other gas into a furnace in such a way as to prolong the life of a furnace roof.

A further object is to reduce localised wear of a furnace roof.

Other objects will appear hereinafter.

Broadly stated, in my invention a moving curtain of gas is caused to sweep over and in contact with that area of the roof at which there is most tendency to wear. The purpose of this is to prevent flame or waste gases from coming into contact with the area in question and above all to prevent them from striking the roof at an angle and being deflected from it. Naturally, the greater the area of the roof which is protected by the moving gas curtain, the less will be the total amount of wear. It is extremely difficult to cause a gas curtain to flow over the whole roof and I make no attempt to do this. However, it is possible to prolong the life of the roof by maintaining the moving curtain over a comparatively small area, where the most severe wear occurs, which in practice lies in the central third of the roof.

The gas constituting the curtain is preferably air, and for ease of description will be referred to as air, but if desired steam or any other gas conveniently available may be used. It is essential that the curtain should move, since otherwise convection and turbulence of the furnace gases would inevitably lead to the permeation of corrosive dusts or vapours to the roof. On the other hand, the curtain must not move too fast, because if it does it will rapidly entrain the combustion gases and cease to be a curtain consisting substantially of pure air, but instead becomes simply a moving mixture of air and corrosive gases. This factor imposes a limitation on the velocity with which the air to form the curtain can be introduced and, therefore, upon the length of curtain which can be maintained by air introduced at a single place in the furnace.

The manner in which the moving curtain is formed depends largely upon the size of the furnace since, as just stated, the length of a curtain starting from a single place is limited. One convenient way is to provide one or more air inlets around a central port for waste gas in one end wall, so that the air for the curtain is introduced at the opposite end to the fuel and flows in the opposite direction to the flame. This is effective in small furnaces such as are used for experimental melts, but in a larger furnace air so introduced will cease to be an effective curtain in contact with the roof before the centre of the furnace is reached. This difficulty can be overcome by introducing further quantities of air at different points along the length of the furnace, so that in effect there are several curtains each constituting a continuation of the one before.

The preferred way of producing the curtain is to introduce the air transversely through either the front wall or the back wall or both. It is to be understood that wherever in the specification and in the claims herein it is said that the air flows in a direction generally opposed to the direction of the burning fuel, that the phrase "generally opposed" signifies that the air flow has a substantial component in direct opposition to or normal to the direction of travel imparted to the burning fuel. If the velocity is not to be so high as to entrain a substantial quantity of combustion gases, the curtain produced by air entering through, say, the front wall will not be effective for more than about ten feet. Beyond this distance the curtain will move too slowly and its dilution with entrained waste gases be too strong for it to be effective. A fairly large furnace, say of 80 tons capacity, may be 15 or 16 feet wide, so if the protection is to extend right across the furnace from the front wall to the back wall it must in such a large furnace be formed by two curtains. These preferably move in opposite directions, flowing respectively from the front or back walls to the longitudinal centre line. However, although it might be expected that the wear in a furnace would take place symmetrically about the longitudinal centre line, in fact, as a result of various causes, it tends to be heaviest close to one or other wall. Accordingly very considerable increase in the life of a furnace can be obtained by introducing the air for the curtain through the wall close to which the heaviest wear takes place, it being understood that the curtain may then cease to exist as an effective shield before it reaches the opposite wall.

In any existing furnace the area subjected to the heaviest wear will, of course, become obvious in the operation of the furnace, and it is easy to convert the furnace to one according to the invention by making openings for the introduction of air in the front or back wall or in both walls. In building a new furnace the area which would be most heavily worn can usually be predicted from the behaviour of a similar existing furnace. However, as a practical working rule in designing a new furnace, it may be said that, to obtain substantial prolongation of the life of the furnace, the protected area should be that which is bisected by the transverse centre line and amounts to half the total roof area. In the majority of cases, the somewhat smaller area constituting the central third of the area of the roof is enough, and, as will be understood from what has been said above, protection of a lesser area may often suffice. In particular, if the wear is localised at the front or back of the furnace, the protected area may be that which extends longitudinally over at least the central third of the furnace and transversely at least from the front or back wall, as the case may be, to the longitudinal centre line.

If the curtain moves in the opposite direction to the flame, whether it is formed by air introduced through an inlet (or inlets) at one point in the length of the furnace or at more than one such point, it should extend over the whole width of the roof, the area protected by the curtain depending on the position of the inlet or inlets. The same is true if the curtain is caused to flow along the furnace in the same direction as the flame. If the air is introduced transversely the length of the protected area depends simply on the length of the front or back wall in which the opening or openings is or are made.

The ways in which the moving curtain may be produced will be more readily understood by reference to the accompanying diagrammatic drawings, in which:

Figure 5 is a section similar to Figure 1 through a modified furnace.

Figure 1:
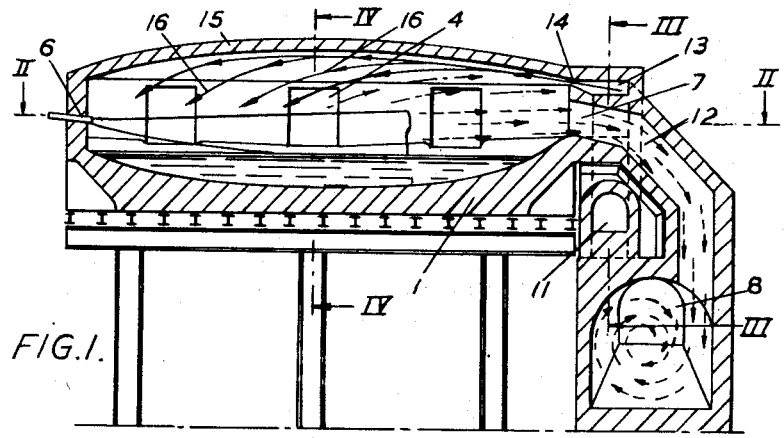
Figure 1 is a central longitudinal section through one small furnace.
Figure 3:
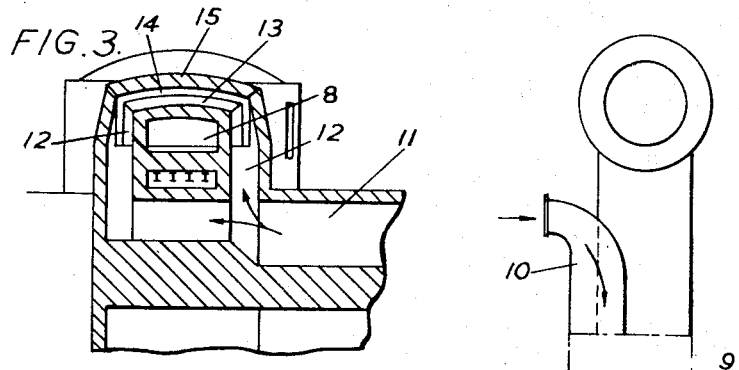
Figures 3 and 4 are vertical sections on the lines III—III and IV—IV, respectively, in Figure 1.

In the furnace shown in Figures 1 to 4 the hearth 1, front wall 2 and back wall 3 are all of conventional shape, charging openings 4 being provided in the front wall and a tap hole 5 in the back wall as usual. A fuel burner 6 passes through one end wall and the waste gases leave through a central port 7 in the opposite end wall and flow downwards through a slag pocket 8 to a heat regenerator 9. The air is supplied through a pipe 10 to the regenerator 9 and after being preheated in it passes through a passage 11 to two vertical passages 12 in the end wall which contains the waste gas port 7. The passages 12 are united at their upper ends by a transverse passage 13 and with it merge into an air inlet 14 of inverted U shape. The roof 15 is arched both longitudinally and transversely so that its shape above the surface of the molten steel or other material that is being heated is that of part of a semi-ellipsoid.

Figure 4:
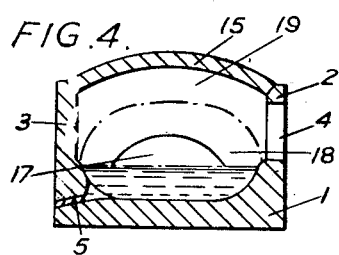
Figure 2:
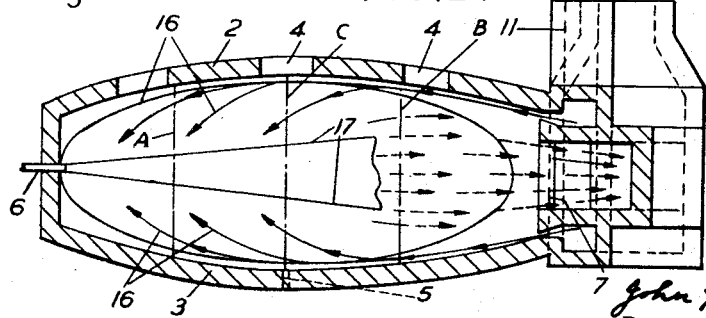
Figure 2 is a horizontal section on the line II—II in Figure 1.

It will be seen that in this furnace the air is admitted substantially as a semi-circular stream around the waste gas port in a direction opposite to that of the fuel entering at the other end. The air flows as a moving curtain along the roof and sides of the furnace. As the velocity of the stream forming this curtain decreases, some of the air is continuously lost from it by moving inwards from the roof or side walls and coming into contact with the burning fuel, as indicated by the arrows 16 in Figures 1 and 2. On the transverse centre line there are three zones as indicated in Figure 4, namely a zone 17 of flame surrounded by a zone 18 of waste gas and flame, which in turn is surrounded by a zone 19 of air moving in the opposite direction. Naturally the boundaries between these zones are not as clearly marked as is shown in Figure 4. It will be appreciated that the velocity of the incoming air should be correlated with the shape in particular of the roof to ensure that the proper amounts of air leave the flowing layer to join the flame throughout the length of travel of the burning fuel, and particularly that a moving curtain of air is maintained in contact with the roof over the desired area. This may be taken to be the area lying between the lines A and B in Figure 2, these lines each being spaced away from the centre line C by a distance equal to one quarter of the length of the furnace measured from the tip of the burner 6 to the mouth of the port 7. In the furnace shown, this means that the moving curtain is maintained over at least three quarters of the total length measured from the waste gas port.

It is important that the roof should present an aerodynamically smooth surface in the direction of flow of the curtain. In the furnace shown in Figures 1 to 4 the roof is continuously and smoothly curved longitudinally and so neither imposes any obstacle to the flow of the curtain nor presents any sudden change in curvature. The roof can even be quite flat in the direction of flow, but what must be avoided is any sudden change in curvature. If, for instance, the roof 15 were flat over such a central length as that between the lines A and B, there would be a sudden change of curvature in the direction of flow at B and, in consequence, the flow pattern of the gases would change completely and the desired air curtain would be lost. Similarly it is necessary to ensure that there is no barrier to the moving curtain such as would be presented by a ledge or step. On the other hand the surface itself need not be smooth in the sense of being polished, and the words "aerodynamically smooth" are to be understood as not relating to the nature of the surface but as meaning that there is no sudden change from one curvature to another with a substantially different radius, nor any major obstruction, such as a ledge, to the moving curtain, nor any other feature which would prevent the moving curtain flowing smoothly in the desired direction.

The existence of the moving curtain presents the further advantage that the air itself extracts heat from the furnace roof and walls, thus raising the air temperature (and therefore increasing the flame temperature), and also enabling a higher flame temperature to be carried without a corresponding increase in roof temperature.

As is well known, the open-hearth steel furnaces at present in use are mostly of the reversing type and are fitted with heat regenerators. One-way or non-reversing furnaces with heat regenerators are little used, because the amount of preheating obtainable with present-day regenerators is relatively low. By means of the present invention the air gains additional preheat as it sweeps over the furnace roof and walls. It therefore becomes practicable to use a one-way furnace with a heat regenerator, such as the furnace and regenerator shown in Figures 1 to 4, in melting steel, or again the same furnace with the regenerator replaced by regenerators controlled by hot valves. Moreover, the absence of air and waste gas ports and ducts at the inlet end so simplifies the construction that directly connected gas producers or pulverised-fuel feeders can be used if desired.

A furnace of the general kind shown in Figures 1 to 4 may be modified in various ways. For instance, the air may be admitted as several streams lying more or less on a semi-circle around the waste gas port, instead of through a single port.

As indicated above, the arrangement shown in Figures 1 to 4 is suitable only for a small furnace and in its application to a larger furnace some of the air forming the curtain is introduced through the port 14 and the remainder is introduced through a series of holes or slots 20 in the furnace roof 15 at positions further towards the fuel entry end as shown in Figure 5, the holes or slots being so arranged that the additional air assists in maintaining the velocity and direction of motion of the moving air curtain. In this case there are three curtains in series, each merging into the next. The area 25 swept by each curtain is continuously curved in the direction of flow, and the discontinuity resulting from the existence of steps 26 at the points where the air is introduced through the roof is immaterial, since these steps are small and not opposed to the moving curtain.

In those arrangements in which the amount of air required to maintain the moving curtain is a substantial part of that required for combustion it is always desirable that the air be preheated to a suitable temperature before entry. If the amount of air required for the curtain is small compared with that required for combustion, the air for the curtain need not be preheated. The amount of air required mainly depends on the area over which the curtain is to be maintained and in particular on the desired length of the effective curtain in the direction of flow. If steam or other gas is used instead of air, it is of course necessary that the ordinary amount of air for combustion should be supplied.

I claim:

1. In the operation of an open hearth furnace or the like having burning fuel directed generally in a given direction into engagement with the charge in said furnace, the method of reducing erosion in a generally central area of the roof of said furnace comprising introducing a gas into said furnace and causing a flow of said gas along said area and in a direction generally opposed to said given direction whereby said gas shields said area from burning fuel and waste gases.

2. An open hearth furnace, comprising a hearth for carrying the charge to be melted, means including a burner for directing burning fuel in a given direction into engagement with the charge on said hearth, a roof over said hearth, and means to provide an insulating shield for reducing erosion of a generally central portion of said roof comprising means to inject a stream of gas into said furnace and to cause the same to flow along said portion and in a direction generally opposed to said given direction.

3. An open hearth furnace, comprising a hearth for carrying the charge to be melted, means including a burner for directing burning fuel in a given direction into engagement with the charge on said hearth, a roof over said hearth, and means to provide an insulating shield for reducing erosion of a generally central portion of said roof comprising means to inject a stream of gas into said furnace and to cause the same to flow along said portion and in a direction opposite to said given direction.

4. An open hearth furnace, comprising a hearth for carrying the charge to be melted, means including a burner for directing burning fuel in a given longitudinal direction into engagement with the charge on said hearth, a roof over said hearth, and means to provide an insulating shield for reducing erosion of a generally central portion of said roof comprising a plurality of ports spaced longitudinally along said roof for injecting streams of gas into said furnace and to cause the same to flow along said roof and in a longitudinal direction opposite to said given direction, said gas forming said shield over said generally central portion of said roof.

5. In the operation of an open hearth furnace or the like having burning fuel directed generally in a given direction into engagement with the charge in said furnace, said furnace requiring a given volume of air for efficient combustion of said fuel, the method of reducing erosion in a generally central area of the roof of said furnace comprising introducing air into said furnace and causing a flow of said air along said area and in a direction generally opposed to said given direction and with sufficient velocity that said air shields said area from burning fuel and waste gases, the velocity of said flow of air having a value sufficiently great that enough air to provide said given volume is drawn therefrom into said burning fuel but not great enough to draw substantial portions of said burning fuel against said area.

6. In the operation of an open hearth furnace or the like having burning fuel directed generally in a given direction into engagement with the charge in said furnace, said furnace requiring a given volume of air for efficient combustion of said fuel, the method of reducing erosion in a generally central area of the roof of said furnace comprising introducing air into said furnace and causing a flow of said air along said area and in a direction opposite to said given direction and with sufficient velocity that said air shields said area from burning fuel and waste gases, the velocity of said flow of air having a value sufficiently great that enough air to provide said given volume is drawn therefrom into said burning fuel but not great enough to draw substantial portions of said burning fuel against said area.

7. An open hearth furnace, comprising a hearth for carrying the charge to be melted, a first end wall located at one end of said hearth, a second end wall located at the other end of said hearth, a roof over said hearth, said roof being substantially aerodynamically smooth over a generally central portion thereof, means located in said first end wall for directing burning fuel in a given direction into engagement with the charge on said hearth, a port located in said other end wall for removing waste gas from said furnace, and means to provide an insulating shield for reducing erosion of said generally central portion of said roof comprising means to inject at least one stream of gas into said furnace and to cause the same to flow along said generally central portion of said roof in a direction opposite to said given direction.

JOHN HUGH CHESTERS.

References Cited in the file of this patent

UNITED STATES PATENTS

| Number | Name | Date |
|---|---|---|
| 1,823,604 | Holbeck | Sept. 15, 1931 |
| 1,973,689 | Geer et al. | Sept. 11, 1934 |
| 2,179,848 | Foster | Nov. 14, 1939 |
| 2,385,261 | Crowe | Sept. 18, 1945 |

OTHER REFERENCES

Pages 41 and 42 of Trinks' Industrial Furnaces, vol. II, second edition, copyright 1942, published by John Wiley & Sons, New York, N. Y.